No. 655,325.  
H. G. CHASE.  
EYEGLASSES.  
(Application filed May 24, 1900.)  
Patented Aug. 7, 1900.
(No Model.)
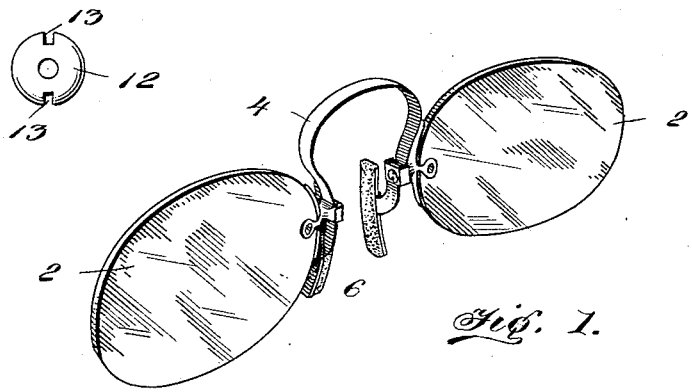
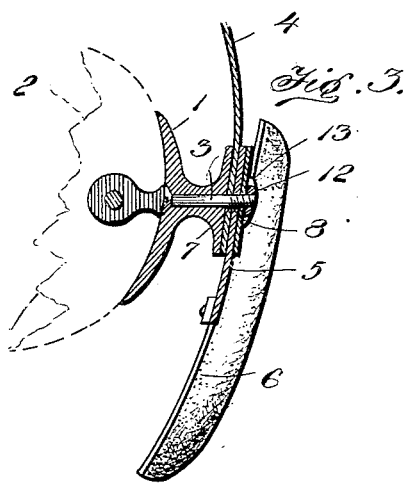
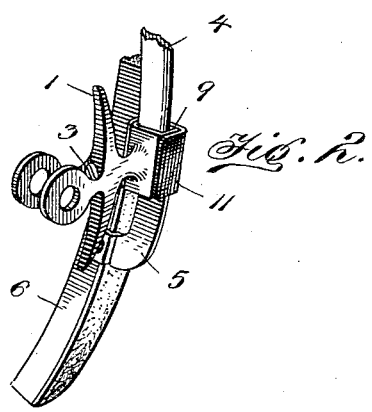
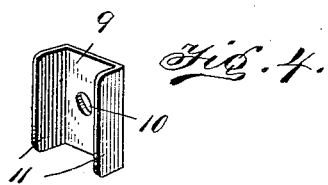
Witnesses  
Inventor  
Herbert G. Chase.

UNITED STATES PATENT OFFICE.

HERBERT G. CHASE, OF NASHUA, NEW HAMPSHIRE.

EYEGLASSES.

SPECIFICATION forming part of Letters Patent No. 655,325, dated August 7, 1900.

Application filed May 24, 1900. Serial No. 17,859. (No model.)

*To all whom it may concern:*

Be it known that I, HERBERT G. CHASE, a citizen of the United States, residing at Nashua, in the county of Hillsborough and State of New Hampshire, have invented certain new and useful Improvements in Eyeglasses; and I do hereby declare the following to be a full, clear, and exact description of the invention, such as will enable others skilled in the art to which it appertains to make and use the same.

My invention relates to improvements in eyeglasses, and particularly to the manner of holding the eyeglasses to the bow or spring.

It consists in an eyeglass having frames for supporting the lenses, a screw or bolt carried by the said frame, the said bolt projecting beyond the frame and engaging the bow or spring and nose-clamp for supporting them in position, and a cap-plate also engaging the said screw or bolt and embracing a part of the bow and nosepieces and a part of the frame, and means for holding the parts in position on the screw, whereby the screw cannot be loosened should the other parts become loosened.

It also consists in certain other novel constructions, combinations, and arrangements of parts, as will be hereinafter fully described and claimed.

In the accompanying drawings, Figure 1 represents a perspective view of a pair of eyeglasses having my improved construction applied thereto. Fig. 2 represents a perspective view of one of the frames upon an enlarged scale, showing the adjacent parts secured thereto. Fig. 3 represents a detail sectional view through the said frame and adjacent parts, the section being taken on a line with the screw or bolt which holds the parts together. Fig. 4 is a detail view of the cap-plate employed for holding the parts in position, and Fig. 5 illustrates a nut which may be employed for binding the parts to the screw of the glass-frame.

The present invention is designed to so construct an eyeglass, and particularly the parts for attaching the glasses or lenses to the spring or bow, that the parts will not become loosened from the glasses or the screw or bolt which is employed in connecting the parts be moved from its proper position by any loosening of the parts.

In carrying out the features of my invention the usual frames 1 1 are secured to the lenses or glasses 2 2 in the ordinary manner. Before placing the frames 1 upon the glasses, however, I insert a screw or bolt, lying flush with the surface of the bracket, which receives the edge of the lens or glass. The other end of the screw 3 preferably projects beyond the frame 1 and is adapted to receive the end of the spring or bow 4 and the supporting-arm 5 of the nose piece or clamp 6. The ends of the spring 4 are provided with apertures, as at 7 7, so as to be capable of being placed over the ends of the screws 3 of the glasses 2. The supporting-arms 5 of the nose-clamp 6 are also each provided with apertures, as at 8, which may be slipped over the ends of the screws 3. In order to further hold the parts in position to prevent them from getting out of proper alinement, I place a cap-plate, as 9, upon the end of the screw 3, said cap-plate being provided with an aperture 10 for this purpose. The cap-plate 9 is provided with side flanges, as 11 11, adapted to embrace the ends of the spring 4 and the arms 5, and also to engage a portion of the frames 1, as will be clearly seen by reference to Fig. 2 of the drawings. A nut, as 12, of any suitable configuration is then applied upon the end of the screw for clamping the parts together. The screw 3 is preferably secured against rotation or any movement by soldering or other suitable means. When thus held in place, it will be seen that the cap-plate 9 will firmly hold the spring and the nose-clamps in proper position so that they will appear to be continuations one of the other. To make a nice finish, the nut 12 is preferably circular in shape, having notches, as at 13, upon its opposite edges for engaging a screw-driver, wrench, or other instrument by which it may be tightly screwed in place.

Among other advantages secured by this construction I would call particular attention to the mounting of the screw 3 in the frame 1, so that it becomes practically a part of the glass or lens to which the frame is secured. When the screw is thus placed in position, it cannot be loosened by the other parts, as the bow or spring and the arms of the nosepieces never become loosened accidentally. The screw 3 thus becomes a strong and permanent fixture upon the glass and makes it possible to secure the other parts of the glasses in a very effective and strong manner. By securing the spring and the arms 5 of the nose-piece in position separately upon the bolt they can readily be removed when anything happens to any one of them without having to replace the other parts. Thus if one of the nose-clamps is broken only one has to be renewed.

The mechanism is exceedingly simple in construction, and I find in practice that it is possible to make a very nice-appearing pair of eyeglasses by the use of my invention.

Having described my invention, what I claim as new, and desire to secure by Letters Patent, is—

Eyeglasses, comprising lenses, frames rigidly secured thereto, screws passed through the frames and rigidly fixed therein, and having their inner ends abutting against the glasses and their outer ends projecting beyond the frames, a bow or spring having apertures near its ends for engaging the said screws, nosepieces having arms provided with apertures for engaging said screws, cap-plates also provided with apertures for engaging the screws, the said cap-plates having laterally-turned-down flanges for embracing the ends of the spring, the arms of the nosepiece and the ends of the frame-arms, and nuts for holding the cap-plate upon the screws, whereby the parts are all firmly bound together, substantially as described.

In testimony whereof I hereunto affix my signature in presence of two witnesses.

HERBERT G. CHASE.

Witnesses:
R. T. SMITH,
J. L. CLOUGH.